Figure 1:
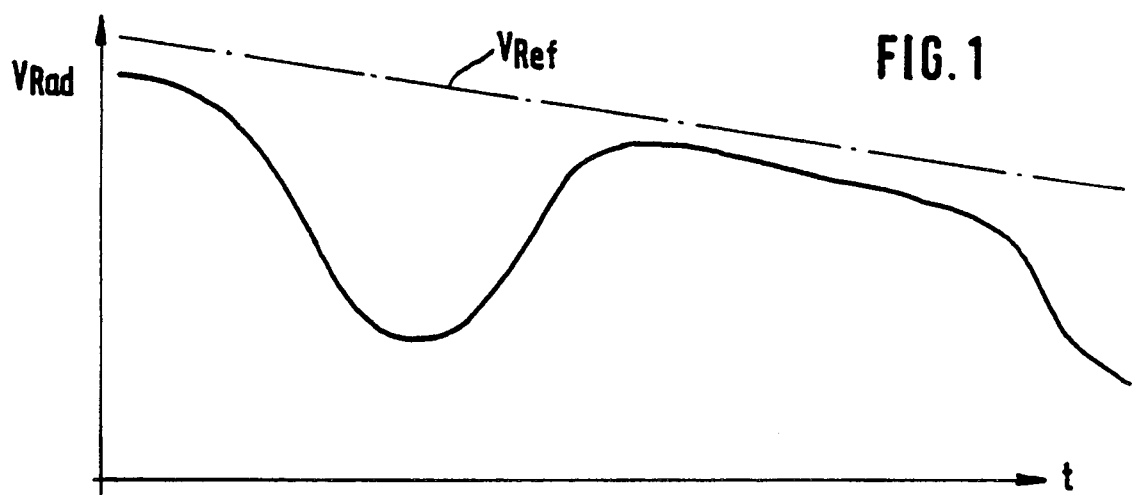
Figure 1:
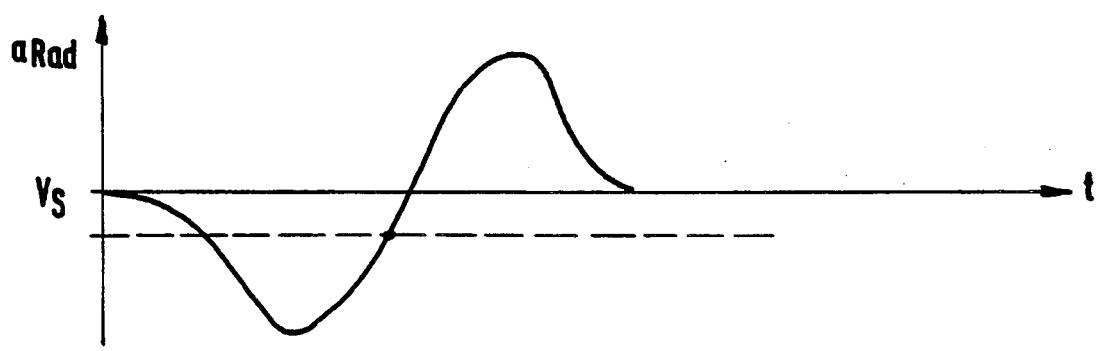
Figure 1:
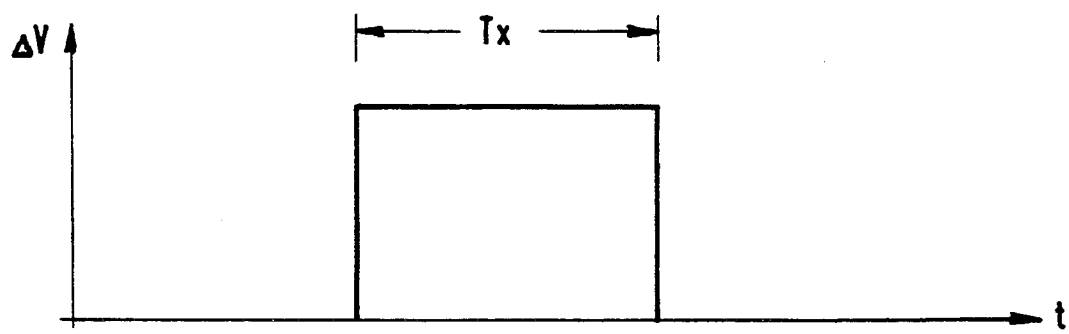
Figure 1:
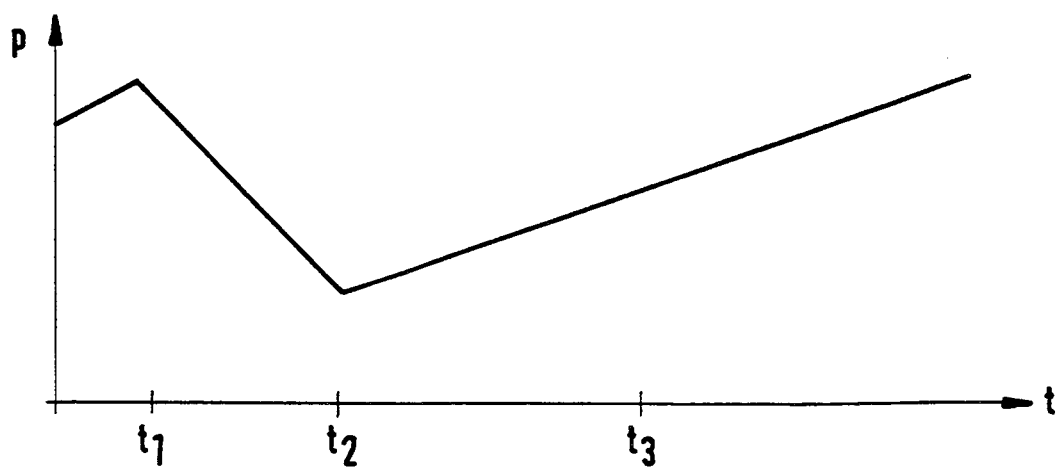

United States Patent [19]
Kampfmann et al.

[11] Patent Number: 5,342,118
[45] Date of Patent: Aug. 30, 1994

[54] ANTI-LOCK BRAKING METHOD TO RETARD THE WHEELS OF A VEHICLE

[75] Inventors: Wolfgang Kampfmann, Moselkern; Hubert Schmitt, Ochtendung; Dieter Voges, Koblenz, all of Fed. Rep. of Germany

[73] Assignee: Lucas Industries public limited company, West Midlands, United Kingdom

[21] Appl. No.: 39,439

[22] Filed: Apr. 30, 1993

[51] Int. Cl.$^5$ .............................................. B60T 8/66
[52] U.S. Cl. ...................... 303/97; 303/105
[58] Field of Search ............. 303/100, 103, 97, 105, 303/110; 364/426.02

[56] References Cited

U.S. PATENT DOCUMENTS

| | | | |
|---|---|---|---|
| 4,140,353 | 2/1979 | Riordan | 303/97 |
| 4,938,544 | 7/1990 | Braschel et al. | 303/97 X |
| 4,992,945 | 2/1991 | Kumpfmueller | 303/103 X |
| 5,117,361 | 5/1992 | Takayawa et al. | 303/97 X |

FOREIGN PATENT DOCUMENTS

| | | |
|---|---|---|
| 0329071A2 | 2/1989 | European Pat. Off. |
| OS3345729 | 6/1985 | Fed. Rep. of Germany |
| 3805270A1 | 8/1989 | Fed. Rep. of Germany |
| 4028193C1 | 2/1992 | Fed. Rep. of Germany |
| 2151732A | 7/1985 | United Kingdom |
| 2227534A | 8/1990 | United Kingdom |

Primary Examiner—Robert J. Oberleitner
Assistant Examiner—Kevin D. Rutherford
Attorney, Agent, or Firm—Oblon, Spivak, McClelland, Maier & Neustadt

[57] ABSTRACT

An anti-lock braking method to retard the wheels of a vehicle provides that brake pressure be augmented or reduced or maintained constant in response to slip and/or the change in the rotational speed (positive or negative deceleration) of a retarded wheel as related to at least one threshold value, and the respective renewed accelerations of the retarded wheels be measured during successive control cycles of the anti-lock braking so as to raise the threshold value or prevent a reduction of the brake pressure for a predetermined period of time in order to suppress undesired control operations which are releasable above all by oscillations of the vehicle axle. To avoid interference of the ABS control by axle oscillations, it is provided that a raised threshold value is maintained for a given period of time and then lowered once more to the basic value if no wheel retardation is measured and the threshold value is not exceeded either during this given period of time, the given period of time being somewhat longer than one axle oscillation period of a vehicle axle, whereas in the event that the threshold value is failed to be reached within the given period of time, this will not initiate a reduction of the brake pressure of the wheel, and a period of time will be measured during which the threshold value remains to be fallen short of, and in the event that this measured period of time is shorter than a predetermined period of time, reduction of the brake pressure continues to be precluded for an additional period of time which is at least as long as one typical axle oscillation period of the vehicle axle.

1 Claim, 2 Drawing Sheets

ANTI-LOCK BRAKING METHOD TO RETARD THE WHEELS OF A VEHICLE

The invention relates to an anti-lock braking method to retard the wheels of a vehicle, wherein brake pressure is augmented or reduced or maintained constant in response to slip and/or the change in rotational speed (positive or negative deceleration) of a retarded wheel as related to at least one threshold value, and wherein the respective renewed accelerations of the retarded wheels are measured during successive control cycles of the anti-lock braking so as to vary the threshold value or prevent a reduction of the brake pressure for a predetermined period of time in order to suppress undesired control operations which may be released above all by oscillations of the vehicle axle.

In anti-lock vehicle brake systems (ABS) the rotation of the individual wheels of the vehicle is monitored constantly, and especially the slip of the retarded wheels as well as their deceleration are determined in order to find out any tendency of the wheel to become locked and to preclude such locking. As soon as the wheel slip or deceleration indicate a tendency toward locking, as manifested by certain predetermined threshold values in respect of slip and/or deceleration being exceeded, any further rise of the pressure in the brake of the respective wheel is terminated or the brake pressure reduced. The pressure in the brake is increased once more to achieve further braking effect with the respective wheel as soon as that wheel has again experienced sufficient rotational acceleration due to its friction with the road surface.

The essential thing in anti-lock brake control is to have the retarded wheels move within the most favorable range of the known coefficient of friction/slip curve, if at all possible, during all the control cycles of braking.

The anti-lock system should react most sensitively and without delay to any changes in the rotational behavior of the retarded wheel indicating a tendency toward locking so as to make it possible to come to a stop at the shortest possible distance while, at the same time, keeping the vehicle in steerable condition. To accomplish that, it would be desirable to adjust the above mentioned threshold values as sensitively as possible, in other words such that a control cycle including a reduction of brake pressure will be initiated even when there are only minor changes in the rotational behavior of the wheel suggesting a tendency to skip.

Yet sensitive adjustment of the threshold value is opposed by the fact that under certain conditions, not altogether unlikely, retarded wheels may display a rotational behavior indicative of great rotational deceleration although the wheel continues to run in a state which still would permit good braking. This phenomenon is well known and described in detail, for instance, in DE-OS 33 45 729. Relatively great differences between the vehicle speed and the wheel speed can occur particularly due to axle oscillations and that mimicks unstable movement of the wheel and, therefore, may lead to undesired control operations, in other words an undesirable reduction of the brake pressure. Abrupt rotational acceleration followed by strong deceleration also may occur if the wheel whose brake is applied runs into a pothole or moves on an uneven road surface.

Such axle oscillations and the like may have the consequence that closely set threshold values in respect of the rotational deceleration of the wheel are surpassed and an undesired control operation (pressure reduction at the retarded wheel) is initiated although there is no risk of the wheel becoming locked.

According to DE-OS 33 45 729 which defines the generic type of method in question undesired control processes are suppressed by varying the threshold value decisive for initiation of the control in response to the run-up acceleration of the controlled wheel. To do that, the run-up acceleration (i.e. the renewed starting of wheel rotation after retardation) is monitored constantly and the threshold value which is decisive for the onset of a control operation, i.e. for pressure reduction in the brake of the wheel is varied when the run-up acceleration exceeds a predetermined limit value. The variation of the threshold value is effected in response to the extent of the run-up acceleration. This means that the threshold value is increased presently to the value which results from the run-up acceleration, and then it decays at a given time function (exponentially or linearly) down to the basic value again The basic threshold value is the threshold value at which the system normally is set in other word when the runup acceleration of the wheel remains below the above mentioned limit value or when no control takes place.

A method of anti-lock braking with which the threshold value decisive for control is adjusted in response to the degree of renewed acceleration of a braked wheel is known also from U.S. Pat. No. 4,140,353.

DE 38 05 270 A1 and the corresponding EP 0 329 071 A2 already present a method of controlling the brake pressure in an antilock vehicle brake system wherein the threshold value is raised briefly by a constant amount with respect to a basic threshold value at the beginning of a pressure reduction or pressure increase during a control cycle in order to avoid undesirable control operations caused by axle oscillations, potholes, or the like. Following that, the threshold value is lowered in response to the period of time of the pressure reduction in the preceding control cycle.

The instant invention is based on a more thorough analysis of the phenomenon of axle oscillations and suggests an ABS control algorithm which guarantees that any undesired ABS control caused by axle oscillations is reliably excluded.

The axles of a motor vehicle together with all the other structural components connected to them elastically or rigidly present a system which is adapted to swing (spring-mass system), being able to carry out oscillations of considerable amplitude upon being deflected out of its position of rest. For instance, in many vehicles the front axle strut (e.g. of the McPherson type) is guided in longitudinal direction exclusively by way of a stabilizer (spring bar) which is retained in rubber bearings.

When a brake torque is built up at such a wheel the system composed of the axle and related parts and capable of vibrating is deflected in a direction contrary to the driving direction so that a relative axle speed is superimposed over the actual wheel speed, the relative axle speed in this event being negative so that it seems as if the wheel were braked. In this position the vibratory system is biased and has accommodated potential energy by deformation of the spring.

If ABS control in this situation causes the brake pressure to be diminished and the brake torque thus to be reduced, the axle of the vehicle becomes accelerated in driving direction, The biased system composed of the axle and its related component parts now gives up its extreme position described above and swings forward in driving direction, passing through the so-called zero position (corresponding to the condition of the axle at rest).

If ABS control then causes the brake pressure to be built up again, the wheel first is slowed down by the additional distance swung forward beyond the zero position. This alone may cause the deceleration threshold value of the ABS control to be exceeded. If the ABS control reacted to this deceleration by emitting a pressure reduction signal that would cause not only ineffective braking but also might re-accelerate the system in driving direction. Furthermore, the axle might even get into a state of resonant swinging which is highly undesirable. The risk of such axle oscillations exists especially on roads which have high coefficients of friction. It was recognized in the prior art quoted above that great reaccelerations of wheels may occur in such situations and those then are drawn upon as indications of axle oscillations.

It is the object of the invention to provide for reliable recognition of axle oscillations in an anti-lock brake control system for vehicles so that any impairment of the ABS control by axle oscillations can be avoided.

With modern motor vehicle axles the resonant vibration frequencies lie between 7 and 15 Hz, depending on the type of vehicle. This resonant frequency can be determined experimentally for any given type of vehicle, for example by causing deflection from the normal position and measuring the vibration time.

The instant invention is based on the finding that accurate observation of the rotational deceleration of a wheel which previously was greatly re-accelerated can provide information about possible axle oscillations.

To that end, in accordance with the invention, the renewed acceleration of the wheel is observed for each control cycle in the course of an ABS control performance which consists of a plurality of control cycles. It is provided according to the invention that another measurement is taken as soon a particularly high renewed acceleration (re-acceleration above the predetermined limit value) has been determined in a control cycle and the re-acceleration, moreover, happened rather quickly. This measurement relates to the rotational deceleration of the wheel in the control cycle directly following the great renewed acceleration (this is in contradistinction to the prior art where axle vibration was concluded directly from the renewed acceleration).

In accordance with the invention then the raised threshold value is maintained for a given period of time and then lowered once more to the basic value if no wheel retardation is measured and the threshold value is not exceeded either during this given period of time, the given period of time being somewhat longer than one oscillation period of the vehicle axle, whereas in the event that the threshold value is failed to be reached within the given period of time, this will not initiate a reduction of the brake pressure of the wheel, and the period of time will be measured during which the threshold value remains to be fallen short of, and then in the event that this measured period of time is shorter than a predetermined period of time, reduction of the brake pressure continues to be precluded for an additional period of time which is at least as long as one typical axle oscillation period of the vehicle axle.

The invention thus is based on the finding that upon axle oscillation in a given vehicle the deceleration of a braked wheel has a typical swinging course at which the oscillation periods are characteristic of the given vehicle axle, in other words dependent on the axle resonant vibration which is specific of the vehicle. According to the invention, therefore, the further course of wheel deceleration is monitored subsequent to an extremely strong re-acceleration (above a predetermined comparative value) and it is inferred that axle oscillation is the cause when quick lowering of the vehicle retardation and subsequently relatively quick rising of the vehicle retardation occur again within a relatively short predetermined period of time which, for example, is slightly greater than the vehicle specific resonant vibration period. The undesired reduction of the brake pressure at the retarded wheel due to this axle oscillation is prevented.

This prevention of the release of undesired control operations can be achieved, for instance, by changing the threshold value responsible for the initiation of a reduction in pressure in a direction toward less sensitive response of the ABS control or by simply excluding the reduction of brake pressure for a predetermined period of time which is longer than a resonant vibration period of the axle but shorter than the typical duration of a control cycle.

Thus a time value associated with the resonant vibration of the axle is determined for the given vehicle in accordance with this solution of the invention. This time value corresponds to one oscillation period in the event of resonance and can be determined experimentally for any given type of vehicle. This time value of the given type of vehicle is stored for good in the computer of the ABS system and then will be available for all ABS control operations. According to the invention, therefore, the period of time during which the rotational retardation of the wheel lies below a given limit value is measured in the control cycle directly subsequent to a particularly high re-acceleration signal above a given limit value, i.e. the time span is determined which lies between the moment at which the rotational retardation of the wheel fails to reach the limit value and the moment at which the rotational retardation of the wheel surpasses this limit value once more. The invention is based on the finding that this period of time provides information as to whether or not the vehicle axle is in a swinging state which aggravates the ABS control. For this reason the period of time, measured as explained above, is compared with the time value memorized which corresponds to half the resonant vibration period of the axle so as to infer a state of axle oscillation if there is agreement within given limits of tolerance. Once such a state of axle oscillation has been recognized in this manner it can be rendered harmless for the ABS control in a number of ways, e.g. by adjusting the threshold value so that it will be less sensitive and to remain so for a period of time which is at least slightly longer than a resonant vibration period of the axle. Instead of raising the threshold value, provision may be made for a given period of time that the ABS computer does not cause any lowering of the brake pressure even if the threshold value is exceeded during this period of time, a circumstance which otherwise would lead to the pressure being lowered. The ABS control algorithm described above is realized by up-to-date technology in that a processor is programmed in accordance with the algorithm. All the hardware components needed to carry out the invention, such as processors, valves, control devices, etc. are known in general in the art of ABS.

A decisive threshold value to initiate pressure reduction, for example, may be a threshold value related to slip, retardation, or speed. In the following description of an embodiment the example drawn upon is a retardation threshold value.

Figure 2:
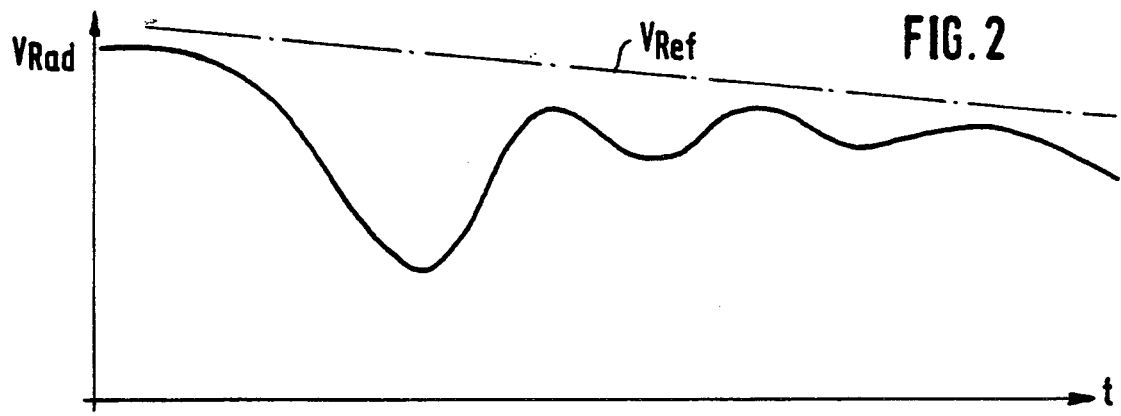
Figure 2:
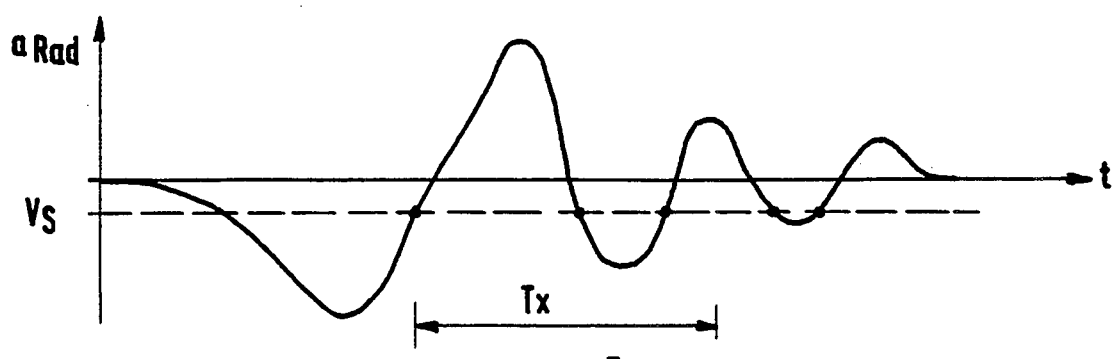
Figure 2:
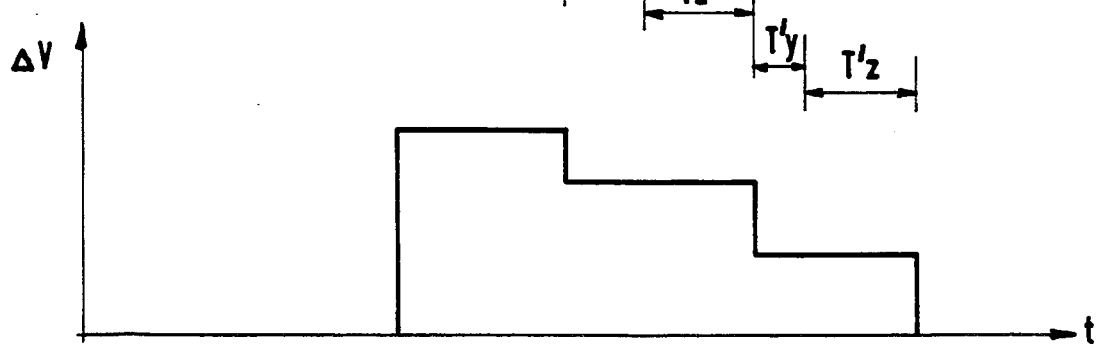
Figure 2:
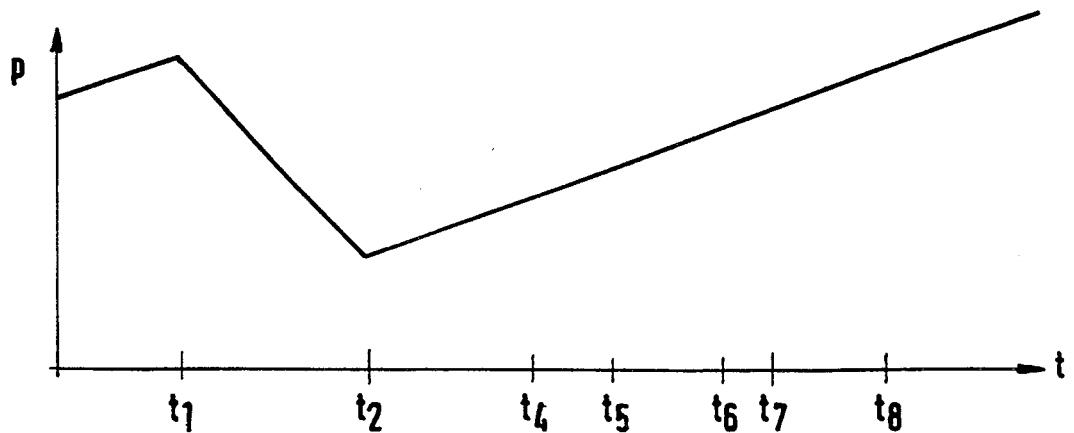

The anti-lock braking method according to the invention will be described further with reference to the drawing, in which:

FIG. 1 shows the courses of a typical wheel speed, wheel retardation, threshold value variation, and the associated brake pressure for anti-lock braking without axle oscillation, plotted above a common time scale, and FIG. 2 is a presentation similar to FIG. 1, relating to anti-lock braking with which axle oscillations do occur.

Plotted in FIG. 1 (from top to bottom) above a common time scale (time t) are the rotational speed $v_{Rad}$ of a wheel whose brake is applied, including the so-called reference speed $v_{Ref}$; the corresponding deceleration of the retarded wheel (in other words the first derivation of the rotational speed shown in the upper figure above time) $a_{Rad}$, including a comparative value $V_S$ in respect of the retardation, a variation $\triangle V$ of the comparative value, and the corresponding brake pressure p. The course of the wheel speed $V_{Rad}$ in FIG. 1 (top) demonstrates that there are no axle oscillations. The wheel speed is lowered a lot due to braking so that the retardation $a_{Rad}$ at time $t_1$ fails to reach the comparative value $V_S$ and the wheel speed $v_{Rad}$ "recovers" again due to the reduction of the brake pressure p and, moreover, the deceleration becomes acceleration, again surpassing the comparative value $V_S$ at time $t_2$. As a consequence of this recovery of the wheel, the brake pressure p is augmented once more from time $t_2$ on.

As shown in FIG. 1, at time $t_2$ also the effective threshold value is increased, i.e. an additional quantity V is added at time $t_2$ to the comparative value $V_S$ first adjusted, with the consequence that the ABS control becomes less sensitive. In other words: in response to time, as shown in FIG. 1, the "normal" comparative value $V_S$ is increased by an additional quantity $\triangle V$ so that, during the time period $T_x$ during which the raised value $\triangle V$ is effective, the effective threshold is clearly set at a higher level, whereby definitely it becomes less likely that this threshold will be exceeded. As a rule, therefore, pressure reduction is excluded at least for the time period $T_x$.

However, the comparative value $V_S$ is not increased by the additional quantity $\triangle V$ to achieve an effective threshold value $V_S+\triangle V$ unless the re-acceleration $a_{Rad}$ of the retarded wheel takes place rather quickly, in other words during a relatively short time span following time $t_1$. Thus it is ascertained whether or not the re-acceleration of the wheel lies above a predetermined comparative value and whether or not the period of time between times $t_1$ and $t_2$ is so short that this indicates the possibility of an existing oscillation of the axle. This means that the period of time from $t_1-t_2$ lies approximately in the range of half an oscillation period of a resonant axle vibration. This includes the admission of tolerances, i.e. deviations from the vehicle specific resonant axle vibration period.

At time $t_2$, therefore, the ABS control algorithm according to the invention starts from the assumption that there is a certain likelihood that the axle of the braked wheel is in a state of oscillating. In order to avoid that the axle oscillation will cause any undesired diminishing of brake pressure p subsequent to time $t_2$ (cf. fight, lower graph), the effective threshold value is set at $V_S+\triangle V$ at time $t_2$ for a period of time $T_x$ (FIG. 1) which at first is somewhat longer than a typical resonant vibration period of the axle (see also FIG. 2). In the case illustrated in FIG. 1, there is no continuation of the axle oscillation subsequent to time $t_2$, i.e. the rotational speed $a_{Rad}$ of the braked wheel takes a "normal" course and once more approaches the reference speed $v_{Ref}$ in the usual manner as the brake pressure rises again after the reduction of brake pressure and subsequent to time $t_2$.

As a consequence there will be no lowering of the deceleration $a_{Rad}$ of the wheel to below the comparative value $V_S$ during the period of time $T_x$ which follows the point in time $t_2$. The computer executing the ABS control algorithm interprets this as a sign that no axle oscillation occurs so that at the end of the period of time $T_x$, i.e. at time $t_3$, the increase of the threshold value by the amount $\triangle V$ is cancelled once again and the comparative value $V_S$ is effective as the "normal" threshold value.

FIG. 2 shows a presentation with which there is axle oscillation. The operations up to time $t_z$ are as described above with reference to FIG. 1. Between times $t_1$ and $t_2$, therefore, quick re-acceleration (i.e. occurring within a relatively short interval) of the wheel has taken place and, what is more, it also was above a relatively high extreme value so that the effective threshold value is raised by the amount $\triangle V$ at time $t_2$. This raising of the threshold value again, for the time being, is done for the period of time $T_x$. However, other than with the course of the wheel speed illustrated in FIG. 1, the wheel retardation $a_{Rad}$ once more fails to reach the comparative value $V_S$ at time $t_4$ due to axle oscillation. The ABS computer interprets this as a strong indication that axle oscillation is happening. Then the period of time $T_y$ is measured during which the wheel deceleration $a_{Rad}$ lies below the comparative value $V_S$ (cf. FIG. 2). This is the period of time between times $t_4$ and $t_5$.

According to a first variant in the realization of the invention, following time $t_5$, the ABS computer prolongs the period of time during which the effective threshold value is increased by an additional quantity $\triangle V$ by a further period of time $T_z$, this period of time $T_z$ depending on the period of time measured before between times $t_4$ and $t_5$, i.e. the period of time $T_y$. As shown in the figure, the set period of time $T_z$ is slightly longer than the measured period of time $T_y$.

In general, axle oscillation will occur as dampened oscillation, as assumed also in FIG. 2. This means that the amplitudes of the course in time of the wheel retardation $a_{Rad}$ become smaller. Accordingly, at every subsequent failure to reach the comparative value $V_S$ at times $t_4$, $t_6$ etc., following a first raising of the effective threshold value by the amount $\triangle V$ at time $t_2$, the quantity of the increase $\triangle V$ of the threshold value can be diminished, as also shown in FIG. 2.

In the case of the embodiment illustrated in FIG. 2, the axle of the wheel whose brake was applied continues to swing beyond time $t_5$, yet with a dampened amplitude. As a consequence, the wheel retardation $a_{Rad}$ again fails to reach the comparative value $V_S$ within the period of time $T_z$ and the ABS computer takes this as an indication that the axle oscillation is continuing. Accordingly, then period of time $T'_y$ is measured, i.e. the period of time between the moments $t_6$ and $t_7$. Therefore, following time $t_7$, the ABS computer does not yet adjust the effective threshold value $V_S + \triangle V$ to the "normal value" (i.e. $V_S$) but instead lets an increase of the effective threshold value continue to be effective for a period of time $T'_z$ which here likewise is set to approximately equal one half oscillation period of a resonant vibration of the axle. It is only after time $t_7$ that the vibrating axle calms down once more to such an extent that failure to reach the comparative value $V_S$ will not occur within the period of time $T'_z$ so that the raising of the threshold value will stop at time $t_8$. It is also possible, by way of modification of the embodiment described above, to measure the period of time $T_y$ measured between times $t_4$ and $t_5$ during which the wheel retardation $a_{Rad}$ fails to reach the comparative value $V_S$ and to compare this with a comparative period of time which was previously memorized permanently for the given type of vehicle and which is typical of an axle vibration of the given vehicle. If the comparison shows that there is sufficient agreement between the period of time $T_y$ measured and the comparative value the ABS computer infers from that circumstance that axle oscillation is taking place and causes the reduction of brake pressure p to be prevented for a certain period of time beginning at time $t_4$. This certain period of time is selected so that it is sufficiently long to fully cover a typical dampened axle oscillation while it is shorter than a typical duration of one control cycle in an ABS control operation.

In the embodiment illustrated in FIGS. 1 and 2 the increase $\triangle V$ of the threshold value is represented as a stepped function in response to time. By way of modifying this embodiment of the invention it is also possible to adjust the increase $\triangle V$ of the effective threshold value in response to the pressure p. The augmentation of the threshold value is lowered as the pressure rises because at rising pressure also the wheel speed approaches the vehicle reference speed $v_{Ref}$ and the ABS control once again should adopt the typical "normal threshold value".

What is claimed is:

1. An anti-lock braking method to retard wheels of a vehicle, wherein
   (a) dynamic wheel behavior is measured and slip as well as variations of rotational speed are determined on the basis thereof;
   (b) signals thus obtained serve for a reduction of brake pressure, for maintaining it constant, or for a renewed rise thereof when associated threshold values are exceeded;
   (c) respective renewed accelerations of the wheels are measured during successive control cycles of anti-lock protection;
   (d) a basic threshold value is increased at the beginning of the renewed rise of the brake pressure to prevent initiation of undesired control operations due to oscillations of an axle or to prohibit a reduction in brake pressure for a given period of time;
   (e) a raised threshold value is returned to the basic threshold value within a control cycle, characterized in that
   (f1) the raised threshold value $(V_S + \triangle V)$ is maintained for a given period of time $(T_X)$ and then lowered once more to its basic value $(V_S)$ if no wheel retardation $(a_{Rad})$ failing to reach a comparative value $(V_S)$ in respect of retardation is measured during the given period of time $(T_X)$, the given period of time $(T_X)$, being somewhat longer than one oscillation period of the vehicle axle,
   (f2) (a) in case the wheel retardation $(a_{Rad})$ again drops below the comparative value $(V_S)$ within the given period of time $(T_X)$, this diminution does not cause a reduction in brake pressure,
   (b) a period of time $(T_y)$ being measured during which the deceleration of the retarded wheel $(a_{Rad})$ lies below the comparative value $(V_S)$, and
   (f3) in case this measured period of time $(T_y)$ is shorter than a predetermined period of time $(T_{ymax})$, reduction of the brake pressure continues to be precluded for an additional period of time $(T_y + T_z)$ which is at least as long as one oxcillation period of the vehicle axle.

* * * * *